Figure 1:
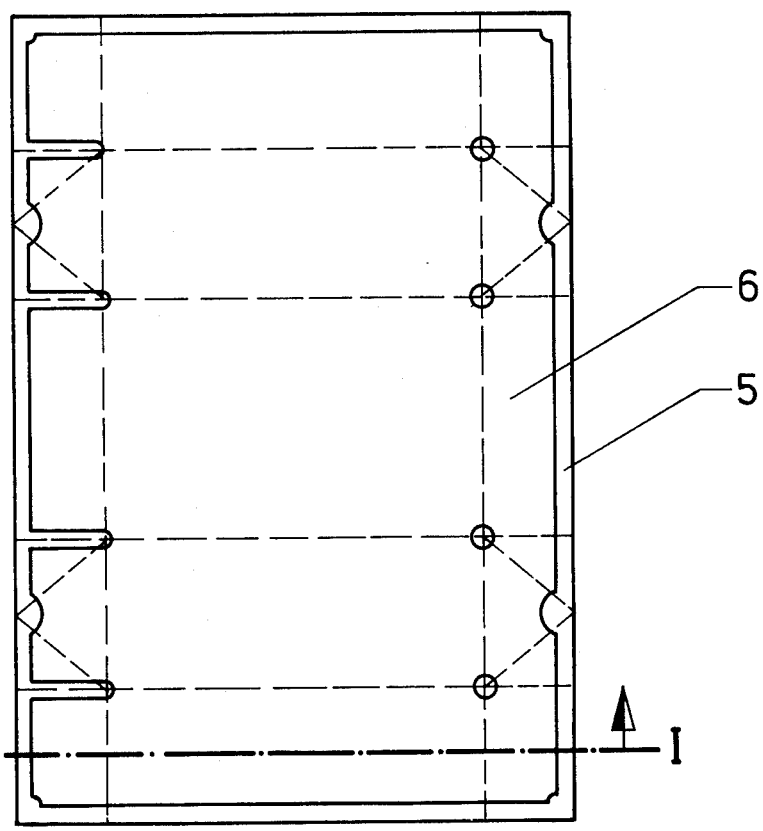

United States Patent [19]

Friess et al.

[11] 4,171,064
[45] Oct. 16, 1979

[54] CARDBOARD BLANK FOR GAS-TIGHT AND LIQUID-TIGHT FOLDING BOXES

[75] Inventors: Hans Friess, Linnich; Fritz Kettenbach, Hückelhoven; Jürgen Färber, Kaarst; Karl T. Witter, Linnich; Ulrich Ströle, Titz, all of Fed. Rep. of Germany

[73] Assignee: Papier- und Kunststoff-Werke Linnich G.m.b.H., Dusseldorf, Fed. Rep. of Germany

[21] Appl. No.: 872,299

[22] Filed: Jan. 25, 1978

[30] Foreign Application Priority Data

Jan. 28, 1977 [DE] Fed. Rep. of Germany ....... 2703533

[51] Int. Cl.² .............................................. B65D 5/56
[52] U.S. Cl. .................................... 220/418; 220/450; 220/453; 229/3.5 MF
[58] Field of Search ................... 229/14 BL, 3.5 MF; 220/418, 450, 483, 463, 441

[56] References Cited

U.S. PATENT DOCUMENTS 2,682,987  7/1954  Spiess, Jr. ............................ 220/450
3,236,436  2/1966  Cheely ................................ 229/37 R

FOREIGN PATENT DOCUMENTS 2412447  3/1973  Fed. Rep. of Germany ...... 229/14 BL

Primary Examiner—Davis T. Moorhead
Attorney, Agent, or Firm—Sprung, Felfe, Horn, Lynch & Kramer

[57] ABSTRACT

In a cardboard blank for a gas-tight and liquid-tight folding box, especially one printed externally, carrying on the cardboard surface which is to be the inside of the box a full-surface layer of heat-sealable plastic, the improvement which comprises an additional plastic layer positioned between the full-surface plastic layer and the cardboard, the additional layer being provided only over portions of the surface including the seam areas, the thickness of the full-surface plastic layer together with the local additional plastic layer being sufficient for tight, hot-sealed seams. The additional layer can be hot melt printed onto the cardboard, before application of the full-surface layer, at the same time the cardboard is printed and/or die cut. By providing the additional layer only in critical areas such as seams or fold lines, a thinner full-surface layer can be provided with an overall economy of plastic.

8 Claims, 2 Drawing Figures

U.S. Patent    Oct. 16, 1979    4,171,064

CARDBOARD BLANK FOR GAS-TIGHT AND LIQUID-TIGHT FOLDING BOXES

BACKGROUND

The invention relates to a cardboard blank for a gas-tight and liquid-tight folding box, especially one bearing external printing, which carries on the inner side, especially on an aluminum foil laminated thereto, a layer of heat-sealable plastic covering the entire surface.

In folding boxes prepared from cardboard blanks, the cardboard gives the box stiffness, and the plastic covering makes the box liquid-tight. In order also to make the box liquid-tight at points subject to particularly great stress, e.g., at corners and edges and in the area of seams or at lines scored for tearing, the inside of the box is covered with a relatively thick layer of plastic, which is polyethylene as a rule. Thick plastic coverings, however, are undesirable both from the viewpoint of costs and from the viewpoint of fabrication. The creasing of the blank is made difficult by the resilient properties of the plastic covering, and folding is opposed by a greater tendency to spring back.

Whenever the folding box is to be not merely liquid-tight but also light-tight and gas-tight, an aluminum foil is placed between the cardboard and the plastic covering.

THE INVENTION

The invention is addressed to the object of creating a plastic-covered cardboard blank which, having an inner plastic covering of very slight thickness, can be fabricated into an impermeable folding box by heat sealing, especially by heat sealing with hot air internal activation.

This object is achieved by the invention with a cardboard blank of the initially mentioned kind, by providing under the full-surface plastic layer, in the area of the seams of the folding box, a local, additional layer of plastic, and by giving the full-surface plastic layer a minimal thickness sufficient to make the folding box impermeable outside of the seam areas, and sufficient, together with the local, additional plastic layer, for impermeable, hot-sealed seams. Preferably, the local plastic layer is additionally provided in the corners.

By means of the plastic applied in greater amount to the areas which are particularly prone to penetration, the folding box is rendered impermeable with a minimal consumption of plastic. An equal impermeability rating and better working characteristics than comparable cardboard blanks are achieved together with a 40 to 50 percent saving of plastic in the inside covering. If, in the case of a blank of the conventional kind, it has hitherto been necessary to apply 70 grams per square meter to achieve the required impermeability, it is necessary to apply to a cardboard blank of the invention having a surface area of 500 cm², for example, an additional coating of plastic (hot melt) of 30 g/m² to only 100 cm² of area in the vicinity of the corners and seams. For the entire blank, a full-surface plastic coating of only 30 g/m² is then sufficient.

That the additional plastic coating is beneath the full-surface plastic coating is advantageous in two ways:

1. If the sealing temperature of the full-surface plastic layer is higher, the result will be a better adhesion at the seams in the freshly sealed state. 2. The local plastic layer of lower softening point is able to penetrate into the cardboard material and thus brings about an internal liquid impregnation which is particularly useful at open cut edges and delicate creases (when set up in three-dimensional form). The additional impregnation prevents liquid from diffusing into the cardboard if any pinholing should occur at the seams.

As the hot melt, a mixture of polymeric plastic, paraffin and resin is selected, which forms a good bond both with the full-surface plastic layer and with the cardboard or the aluminum foil, as the case may be. A polyolefin, especially polyethylene, is used as the plastic for the full-surface plastic layer. Good results have been obtained with a plastic mass which by weight comprises about 20 to 60% of waxy hydrocarbon and 80 to 40% of higher polymer.

The cardboard blank of the invention can be made by applying the local plastic layer in one operation with the printing and/or die-cutting, prior to the application of the full-surface plastic layer by the extrusion of plastic or by the bonding on of a prepared plastic film. The steps of the process can be performed in this manner because the local application of plastic is in a specific spatial relationship with the printing and the die-cutting.

Figure 2:
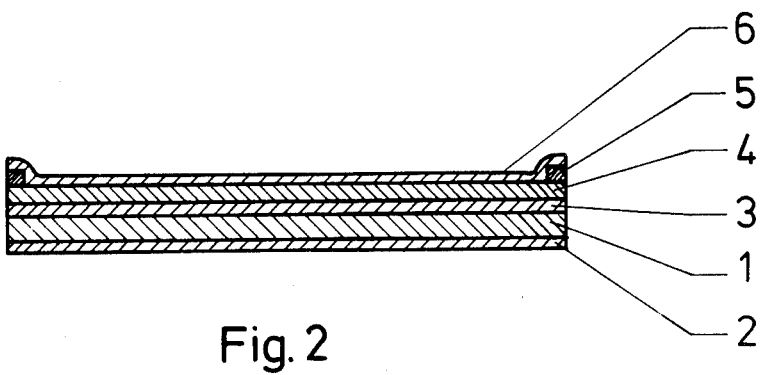

The invention will be further explained with the aid of a drawing representing an example of its embodiment. In the drawing, FIG. 1 is a plan view of a cardboard blank, and
FIG. 2 is a cross-sectional view of the cardboard blank taken along line I—I in FIG. 1.

The cardboard blank, which has the crease lines indicated by the broken lines in the drawing for the arrises of the folding box, consists of cardboard 1 to the outer side of which a plastic covering 2 is laminated, and which may bear printing. On the inner side, an aluminum foil 4 is laminated to the cardboard 1 by a plastic intermediate layer 3. The plastic used for the lamination is polyethylene. A spot application 5 of plastic, namely of a hot melt composed of 20 to 60% of waxy hydrocarbon and 40 to 80% of polymer, is made on the aluminum foil 4 in the area of the seams and corners in the manner of stencil coating. The hydrocarbon consists of waxy paraffins and/or hydrocarbon resins. The polymer can consist of polymers on the basis of ethylene, propylene and/or butylene, or of ethylene-vinyl acetate or styrene-butadiene copolymers. The amount applied is about 25 to 30 grams per square meter. A plastic layer 6 is applied by extrusion, or a plastic film is laminated, to this plastic coating and to the free area of the aluminum foil. This plastic is a polyethylene having a softening point of about 100° C. The softening point of the hot melt is lower than that, being, for example, 90° C. The plastic sheet 6 is of a thickness of 30 grams per square meter.

It will be appreciated that the instant specification and examples are set forth by way of illustration and not limitation, and that various modifications and changes may be made without departing from the spirit and scope of the present invention.

What we claim is:

1. In a cardboard blank for a gas-tight and liquid-tight folding box, especially one printed externally, carrying on the cardboard surface which is to be the inside of the box a full-surface layer of heat-sealable plastic, the improvement which comprises an additional plastic layer positioned between the full-surface plastic layer and the cardboard, the additional layer being provided only over portions of the surface including the seam areas, the thickness of the full-surface plastic layer together with the local additional plastic layer being sufficient for tight, hot-sealed seams.

2. A cardboard blank according to claim 1, wherein the additional plastic layer is additionally provided at the areas which will form the box corners.

3. A cardboard blank according to claim 1, wherein the plastic of the additional plastic layer is hot meltable.

4. A cardboard blank according to claim 3, wherein the additional plastic layer is composed of about 20 to 60% by weight of waxy hydrocarbon and 80 to 40% of higher melting polymer.

5. A cardboard blank according to claim 1, wherein the plastic of the full-surface plastic layer comprises polyethylene.

6. A cardboard blank according to claim 1, wherein the softening temperature of the additional plastic layer is slightly below that of the full-surface layer.

7. A cardboard blank according to claim 1, including an aluminum foil laminated to the full-surface plastic layer.

8. A cardboard blank according to claim 7, wherein the additional plastic layer is composed of about 20 to 60% by weight of waxy hydrocarbon and 80 to 40% of higher melting polymer, the plastic comprises polyethylene, the softening temperature of the additional plastic layer is slightly below that of the full-surface layer, and the additional plastic layer is additionally provided at the areas which will form the box corners.

* * * * *